May 30, 1939.  D. WELT  2,160,570
SHIELDED ROLL STIPPLER
Filed Sept. 14, 1938

David Welt
INVENTOR

BY Victor J. Evans & Co.
ATTORNEYS

Patented May 30, 1939

2,160,570

UNITED STATES PATENT OFFICE 2,160,570

SHIELDED ROLL STIPPLER

David Welt, Bronx, N. Y.

Application September 14, 1938, Serial No. 229,942

2 Claims. (Cl. 101—376)

This invention relates to a shielded roll stippler.

An object of the invention is to provide a roll stippler having a novel handle which will permit the roller running close to door casings, moldings and other fixtures without smearing them, when a freshly painted surface is being stippled.

A further object of the invention is to provide novel shields which protect the face of the operator from spatters kicked up by the knap of the roller during the stippling operation.

A further object is to provide a roller stippler which can be manipulated to easily reach hitherto inaccessible places such as behind radiators and the like, which will spread the paint evenly, which will be formed of a few strong durable and inexpensive parts, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1:
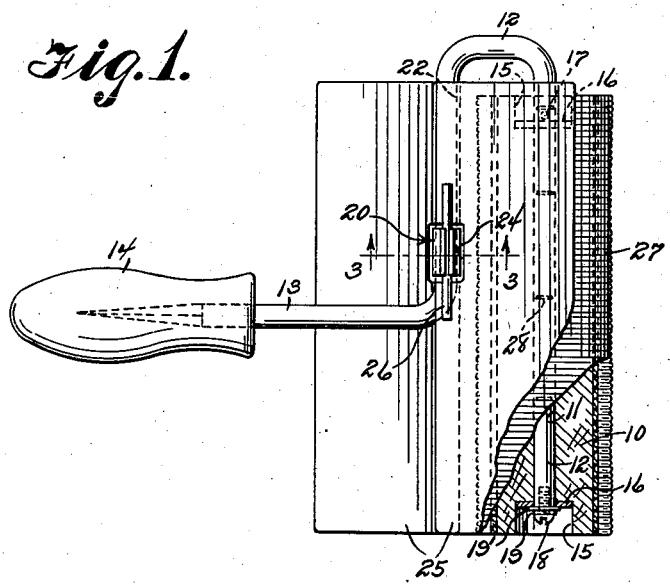
Figure 1 is a plan view of a shielded roll stippler constructed in accordance with the invention, with parts broken away to show the construction of the roller.

Referring now to the drawing, in which like characters of reference designate similar parts in the various views, 10 designates a roller preferably formed of wood and having an axial bore 11 adapted to receive a substantially U-shaped handle 12 one leg of which constitutes a shaft upon which the roller is rotatably mounted and the other leg of which is of substantially one-half the length of the roller and is terminally directed laterally at a right angle to provide a shank 13 which is terminally equipped with a grip 14.

The ends of the axial bore of the roller are uniformly enlarged to provide recesses 15. Washers 16 are sleeved upon the shaft 12 within these recesses, one of the washers being held against outward movement through the medium of a cotter pin 17 while the other washer is held in place through the medium of a screw 18 which is threaded into the end of the shaft 12 and is provided with a lock washer 19 and flat washer 19'. The washers 16 prevent endwise movement of the roller on the shaft and at the same time removably mount the roller on the shaft for replacement with a new one when worn.

Figure 2:
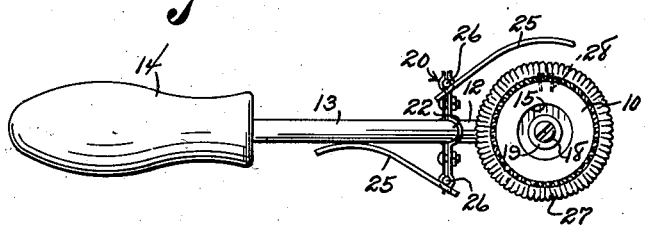
Figure 2 is a side elevation of the roll stippler shown in Figure 1.
Figure 3:
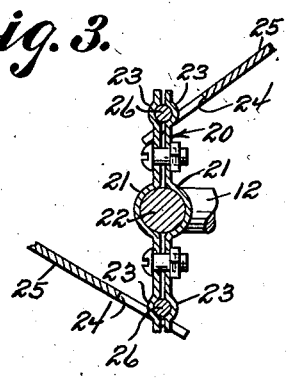
Figure 3 is a detail cross sectional view taken on the line 3—3 of Figure 1 and showing the construction of the clamp for mounting the shields on the roller.

As best shown in Figure 3, a two-piece clamp 20 is provided with clamping jaws 21 which embrace the short leg 22 of the U-shaped handle 12. The clamp is provided at the ends with arcuate jaws 23 which are engaged through respective recesses 24 formed in the edges of respective arcuate metal plates 25 and embrace respective pins 26 which are secured to the plates transversely of the recesses in any preferred manner. These pins form hinge pintles upon which the plates 25 may be swung to operative position to overlie the roller and to inoperative position to extend along the shank 13 of the handle, as best shown in Figure 2. These plates form shields to be selectively moved to operative position for protecting the operator's face and eyes from splashes of paint kicked up by the roller during the stippling operation.

The roller is covered with a cylindrical sheet 27 of carpet material having a suitable knap to engage a freshly painted surface and evenly stipple the surface while preventing a skidding or smearing action. In applying the carpet facing of the roller the two edges are brought together and, as best shown in Figure 2, are secured to each other and to the roller through the medium of staples 28. Whatever portion of the knap may be lodged underneath the transverse portions of the staples may be disengaged by slightly lifting the staples so that in the finished article the knap will naturally fill in the space between the ends of the cylindrical carpet facing and the meeting ends are not discernible.

It will be particularly pointed out that only one end of the shaft 12 projects beyond the roller. Thus the concealed end of the shaft lends to the roller and its carpet facing a plain surface which may be juxtaposed against projections such as molding, door and window frames, or the like, and permit the stippling to be done close up to these parts without the paint being scratched or marred.

In operation the operator moves the stippler roller over the freshly painted surface in the usual manner after moving one of the shield plates 25 to operative position between the roller and the operator's face to protect the operator from paint splashes. The hinge pins 26 of the shield plates engage the jaws 23 of the two-piece clamp with sufficient friction to hold the plates in either operative or inoperative position without further attention after once being set.

From the above description it is thought that the construction and operation of the invention will be fully understood without further explanation.

What is claimed is:

1. A stippler comprising a roller, a cylindrical sheet of carpet material on the roller having a uniform knap throughout its entire cylindrical surface adapted to engage a freshly painted surface and stipple the surface uniformly, a U-shaped handle having one leg engaged axially in the roller to form an axis of rotation for the roller and terminating short of one end of the roller to permit the roller and carpet material to be juxti-posed against projections and permit the stippling to be done close to the projections, the other leg of the handle being substantially one-half the length of the roller and terminally directed laterally at a right angle to provide a shank of the handle for manipulating the roller, a clamp carried by the last named leg and disposed near said shank, and shield plates hinged to said clamp above and below the last named leg and adapted to be selectively rocked to operative position to overlie the roller, and adapted to be selectively rocked to released position against said shank.

2. A stippler comprising a roller, a cylindrical sheet of knapped material sleeved on the roller, a shaft having one end projecting from one end of the roller, the other end countersunk in the opposite end of the roller, said projecting end of the shaft being directed to overlap and extend longitudinally of the exterior of the roller and form a handle supporting member, a two-piece clamp provided with clamping jaws embracing the last named member, arcuate jaws on the ends of the clamp, arcuate metal splash plates having recesses receiving said jaws, pivot pins extending through said jaws and secured to the plates transversely of the recesses, said pivot pins forming hinge pintles upon which the plates may be swung to operative position to overlie the roller and to inoperative position to extend outwardly from said member.

DAVID WELT.